July 30, 1929.  L. B. JONES ET AL  1,722,800
ROTATING ASSEMBLY
Filed June 18, 1921
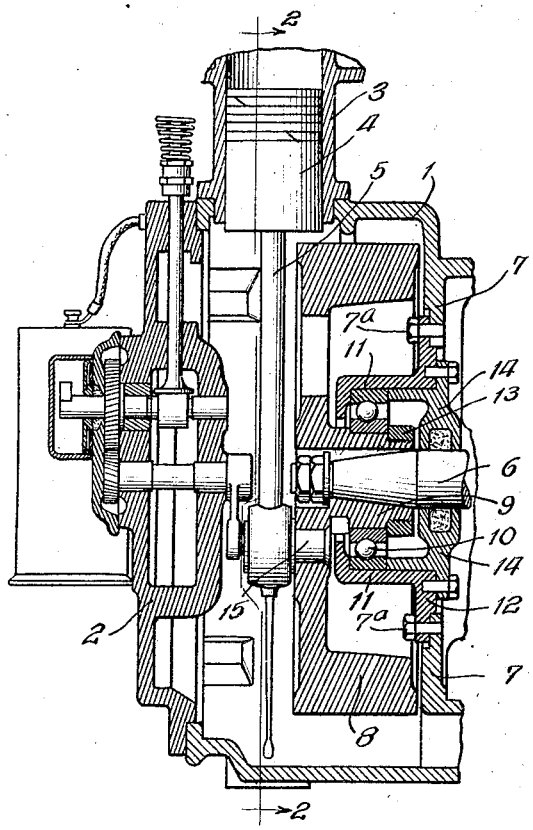
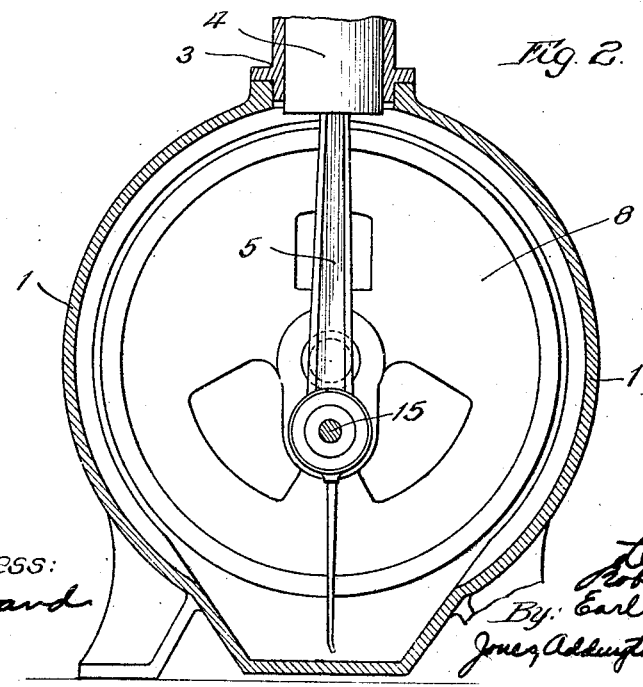

Patented July 30, 1929.

1,722,800

UNITED STATES PATENT OFFICE.

LEE B. JONES, EARL W. JONES, AND ROBERT G. BATTIN, OF EVANSVILLE, INDIANA, ASSIGNORS TO SUNBEAM ELECTRIC MANUFACTURING COMPANY, OF EVANSVILLE, INDIANA, A CORPORATION OF INDIANA.

ROTATING ASSEMBLY.

Application filed June 18, 1921. Serial No. 478,668.

Our invention relates to rotating assemblies and it has particular relation to the combination of a driving machine with a driven machine wherein the shaft of the driven machine is so connected to the driving machine, through the intermediary of a fly wheel, that the stresses usually occasioned by the reciprocation of high speed driving means are substantially eliminated.

In the following description of our invention we have discussed a combination of the above character as applied to a rotating assembly wherein it has been usual heretofore to employ a connecting rod extending from a portion of the driving machine into connection with the shaft of the driven machine. In such combinations the aforesaid rod is connected to a U-shaped crank, one arm of said crank being journalled in a frame whereas the other arm thereof is positively fastened to the driven shaft. The driven shaft is usually journalled at two points in a frame and constitutes the means whereby any desired machinery is operated.

Finally, a machine of the character described is provided with a fly wheel which is so mounted at some point on the shaft that the inertia of the considerable mass comprising the wheel suffices to carry the driven machine smoothly over the low power points of the prime mover.

Those skilled in the art are well aware of the difficulties which are inherent in a machine having the characteristics just described. Inasmuch as the driving impulses are applied to the shaft at a point outside of the journalled points of the shaft, a decided bending stress is exerted on the shaft. The fact that the heavy fly wheel is likewise usually mounted outside the journals of the shaft serves to accentuate the effect of the reciprocating stresses upon the shaft.

In our improved rotating assembly we provide means for connecting the driving rod to the driven shaft whereby one point of shaft suspension is in very close proximity to the plane of reciprocation of the connecting rod. This construction brings a bearing support as close as possible to the line of force of the power impulses, thus relieving the shaft from all stress other than those occasioned by the transmission of the power from the connecting rod to the mechanism driven by said shaft.

As above pointed out, the fly wheel, which must be used in machines of the character described, also produces undesirable stresses since it cannot be mounted between the points of shaft suspension. In our rotating assembly we so associate the fly wheel with the driven shaft and the connecting rod that instead of the fly wheel being an added source of undesirable stresses it acts as a desirable support for the shaft.

In order to accomplish this object, a fly wheel in our machine is provided with a bearing portion which is positioned substantially in the vertical plane through the center of mass of said wheel. A bearing is disposed about said portion and serves to facilitate the rotation of said wheel within a journal-like bearing housing portion which is attached to a frame. Another way of stating the problem is that the fly wheel is the reservoir of energy and that, in the usual machine embodying the same, the power is supplied to the fly-wheel reservoir in a round-about way thru the shaft. In our invention, the energy is supplied directly to the wheel and a corresponding advantage obtained.

From this brief description, and as will be better understood from the following discussion, it will be apparent that the shaft itself is "floating" in character and that it does not receive direct stresses but is rendered independent of the same by the manner in which the fly wheel is journalled in the frame. By this particular combination the suspension point of the shaft is carried a considerable distance outside of that point at which it would have to be supported and journalled were the fly wheel mounted in the usual way on the shaft and a shaft itself journalled in a frame.

Again, we further reduce the reciprocating strain in, or bending stress upon, the shaft, by eliminating from our rotating assembly the U-shaped crank which has heretofore been employed therewith. The connecting rod in our combination is pinned directly to the face of the fly wheel whereby the plane of reciprocation of said rod and the point of suspension of said fly wheel are brought very close together. It follows, therefore, that the power impulses are transmitted to the shaft in very close proximity to its point of suspension whereby the bending moment of the shaft is reduced to a negligible minimum.

Finally, in the machine which we will hereinafter describe we have illustrated the aforementioned fly wheel as mounted directly within the crank casing. We find that such mounting of the wheel is particularly beneficial in realizing the above described combination whereby certain stresses are substantially reduced.

For a better understanding of our invention reference may be had to the accompanying drawing; in which, Fig. 1 is an elevational sectional view of a rotating assembly embodying our invention, the same being illustrated as employed in an internal combustion engine although said drawing is merely illustrative since the invention in question may be advantageously utilized in other connections; and, Fig. 2 is an elevational view taken on the line 2—2 of Fig. 1.

Referring more particularly to the drawing, a crank casing 1 of a machine has an end frame member 2 associated therewith to close the end of said casing. A number of valve timing devices are shown as associated with the end frame 2 but inasmuch as this particular end frame forms the subject matter of a copending application filed by Lee B. Jones, Serial No. 478,664, on June 18, 1921, and assigned to the Sunbeam Electric Manufacturing Company, we will not further describe the same herein.

A cylinder 3 is mounted above the crank casing and a piston 4 is shown as reciprocating therein, while a connecting rod 5 extends downwardly from the piston into the crank casing. A portion of a shaft 6 is shown and it will be understood that the right hand end thereof is supported and journaled in any desired manner consistent with the mechanism which is to be operated by said shaft. The crank casing 1 has formed integrally therewith a frame 7. This frame may, in some machines, be independent but is here shown as forming an apertured barrier between the crank casing and the driven machine.

Rigidly mounted on the shaft 6 and disposed within the crank casing 1 is a fly wheel 8. Said wheel is provided with a central hub portion 9 which comprises a bearing support for one race of a bearing device 10 which is disposed thereabout. A bearing housing 11 surrounds the bearing 10 and is provided with an annular flanged portion 12 by means of which it may be secured to the frame 7. A bearing nut 13 and a bearing retainer 14 serve, together with the housing 11, to firmly position the bearing device 10 in the proper relation about the hub portion 9 of the fly wheel.

It will be noted that the bearing retainer 14 closely surrounds the shaft 6 and so cooperates with the frame 7 that the opening therein is closed. The fly wheel 8 is formed to provide a counterbalance through proper distribution of the mass thereof with relation to a crank pin 15 which connects the rod 5 directly to the face of the fly wheel 8. It will be noted that the apertures in the fly wheel are advantageously located so that a wrench or other convenient tool may be passed therethrough to loosen the bolts 7$^a$ which serve to secure the bearing housing of the fly wheel to the frame. By so loosening said bolts the fly wheel and its associated shaft and other portions may be withdrawn bodily from the machine.

From the above description it will be noted that the element 8 comprises an integrally formed crank, counterbalance, and fly wheel. This in itself is contributory to the high degree of balance which we are able to obtain in machines of the character above described.

Moreover, it will be noted that the particular mounting of the fly wheel on the shaft and the journalling of said wheel, as above described, together with the elimination of the usual U-shaped crank and the pinning of the connecting rod directly to the face of the fly wheel, results in the left hand point of shaft support being in very close proximity to the plane of reciprocation of the connecting rod.

It is primarily because the U-shaped crank is no longer in the way that it is possible to associate, with the crank pin, the cooperating member which is driven by said pin to accomplish the above-noted desirable results.

The manufacturing costs in a structure such as we have described are lowered because of two considerations. In the first place, only one heavy support for the shaft is needed while a light metal member suffices for the other end. Again only two points of alignment need be considered instead of three as is usual, and the chances of manufacturing error are reduced to a minimum. Since the machine balance is secured through the particular positioning of the fly wheel instead of by adding balancing weights at certain points, another source of error is eliminated. As a matter of fact, the balancing is made easy because the balancing weight or wheel is close to the plane of reciprocation with but few intervening parts.

Because of the manner in which the shaft is mounted on the wheel, the latter being journalled, rather than the wheel being mounted on a journalled shaft, an extremely long contact surface between the cooperating energy-transmission surfaces on the wheel and shaft is afforded. This is in accordance with the theoretical demands of power transmission as is also the positioning of such bearing surface as close to the plane of reciprocation as possible.

As we have more specifically pointed out in our copending application, the provision of such a fly wheel connection and the elimination of the U-shaped crank facilitates the dismantling of the unit since the pin disconnection can be effected laterally after the end frame 2 is taken off.

While the aforesaid combination is simple in construction it is quite effective in giving smooth and quiet operation. That power which has heretofore been employed in overcoming the above difficulties is, to a large extent, saved and the entire assembly is very easily balanced.

While we have described but one embodiment of our invention it is obvious that many modifications therein may occur to those skilled in the art and we desire, therefore, that the same be broadly interpreted and limited only by the showing of the prior art and the scope of the appended claims.

Having thus described our invention, what we claim as new and desire to secure by Letters Patent is:

1. A prime mover comprising a connecting rod, a driven machine embodying a flywheel, and means for journalling said flywheel in close proximity to the plane of reciprocation of said rod and substantially in the plane of the center of inertia of said wheel.

2. A prime mover comprising a connecting rod, a machine embodying a shaft, a flywheel mounted on said shaft and having said rod pinned directly thereto, and means for journalling said wheel in one wall of the frame of said driven machine in close proximity to the plane of reciprocation of said rod and substantially in the plane of the center of inertia of said wheel.

3. In combination with a machine, a frame, a shaft, a fly-wheel mounted on said shaft, said wheel having a hub, a bearing disposed thereabout, and means for retaining said bearing on said hub, one of said means being adapted for attachment to said frame.

4. In combination with a machine, a frame, a shaft, a fly-wheel mounted on said shaft, said wheel having a hub, a bearing disposed thereabout, and means comprising a bearing housing and a bearing retainer for retaining said bearing, said bearing housing being adapted for attachment to said machine frame.

5. In combination with a machine, a frame having an opening therein, a shaft, a fly wheel mounted on said shaft, said wheel having a hub, a bearing disposed thereabout, and means comprising a bearing housing and a bearing retainer for retaining said bearing, said bearing housing being adapted for attachment to said machine frame and said retainer being formed also to surround said shaft and form with said housing a closure for the opening in said frame.

6. A prime mover comprising a driving rod, a machine embodying a shaft adapted to be driven by said rod, a fly wheel mounted on the end of said shaft, and means embodying said wheel for connecting said shaft to said rod and supporting said shaft so that it is substantially free from bending stresses.

In witness whereof, we have hereunto subscribed our names.

EARL W. JONES.
LEE B. JONES.
ROBERT G. BATTIN.